Aug. 26, 1952 — H. R. MERRIMAN — 2,608,502
HONEYCOMB STRUCTURE AND METHOD OF MAKING SAME
Filed Feb. 15, 1947

Inventor
HELEN R. MERRIMAN,
By Donald W. Farrington
Attorney

Patented Aug. 26, 1952

2,608,502

UNITED STATES PATENT OFFICE 2,608,502

HONEYCOMB STRUCTURE AND METHOD OF MAKING SAME

Helen R. Merriman, Riderwood, Md., assignor to The Glenn L. Martin Company, Middle River, Md., a corporation of Maryland Application February 15, 1947, Serial No. 728,920

5 Claims. (Cl. 154—110)

My invention relates to honeycomb structural material and more particularly a method of forming a cellular structure of resin impregnated fabric material bonded together at longitudinally spaced intervals under heat and pressure with intervening spaces prevented from bonding by being masked from contactual engagement with the bondable resin impregnated material by strips of non-bondable material placed therebetween at spaced intervals prior to bonding.

In the construction of a light-weight sandwich panel in which outer high density surface sheets such as aluminum or magnesium alloy stock are separated by a core material, it has been found that the structural properties of the finished panel depend on the flexural strength weight ratio of the materials used. Therefore, structural efficiency of such a panel structure can be enhanced by the use of a core material having a stiffness and weight criterion proportional to the strength of the surface sheets. Prior to this time, the core materials available have limited the scope of application of such sandwich panels due to their high cost of production and the lack of flexural stiffness attained in the finished product. The present invention has overcome these disadvantages by providing an inexpensive method of producing a honeycomb structure from relatively dense material that possesses distinct advantages as a stabilizing medium by reason of the fact that the inherent strength of the dense material is fully utilized and all of the advantages of light-weight construction are attained in a cellular assembly characterized by a specific gravity of from .10 to .035.

The present invention provides a honeycomb structural material and a method of making wherein a plurality of sheets of flexible phenolic impregnated material are bonded together at spaced intervals with the non-bonding of the intervening areas effected by having spaced strips of non-bondable material placed between the impregnated sheets prior to bonding as an assembly and expanded and cured to form a stiff cellular structure having cell walls capable of supporting relatively heavy loads.

It is one of the objects of the present invention to provide honeycomb core material comprised of strips of resin impregnated material bonded together at spaced intervals and cured by the application of heat and pressure to form a cellular assembly having a plurality of supporting walls of predetermined shape and size.

Another object is to provide a structural material having an assembly of cell walls in which said wall members are bonded together so as to allow for expansion and angular adjustment to effect a shaped structure on curing.

A still further object of my invention is to provide a method of making structural material comprised of strips of flexible resin impregnated material bonded together at spaced bond areas by the application of heat, shaped and expanded and stiffened by curing so as to produce a cellular assembly having a predetermined specific gravity and strength ratio.

Another object of this invention is to provide a method of making honeycomb structural material having a plurality of walls bonded together to provide an expansible structure capable of being formed to a variety of shapes and curvatures.

A still further object of this invention is to provide a method of making a relatively stiff cellular stabilizing structure by the bonding together of sheets of bondable material at spaced bond areas with the intervening areas masked against bonding by the insertion of strips of non-bondable masking material, cutting the assembly to the desired widths of finished product, separating the material at the non-bonded areas to form cells having bonded and non-bonded wall areas, with the masking material positioned adjacent said non-bonded areas, and fixing of the geometry of the cells by curing.

Other objects of this invention will become apparent from the following description when taken in conjunction with the accompanying drawing in which like numbers refer to like parts in different views.

Figure 1:
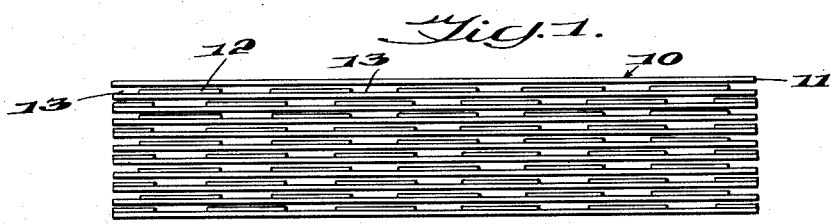
Figure 1 is a sectional view of the sheets and masking strips that form the cellular structure in assembled position prior to bonding.
Figure 2:
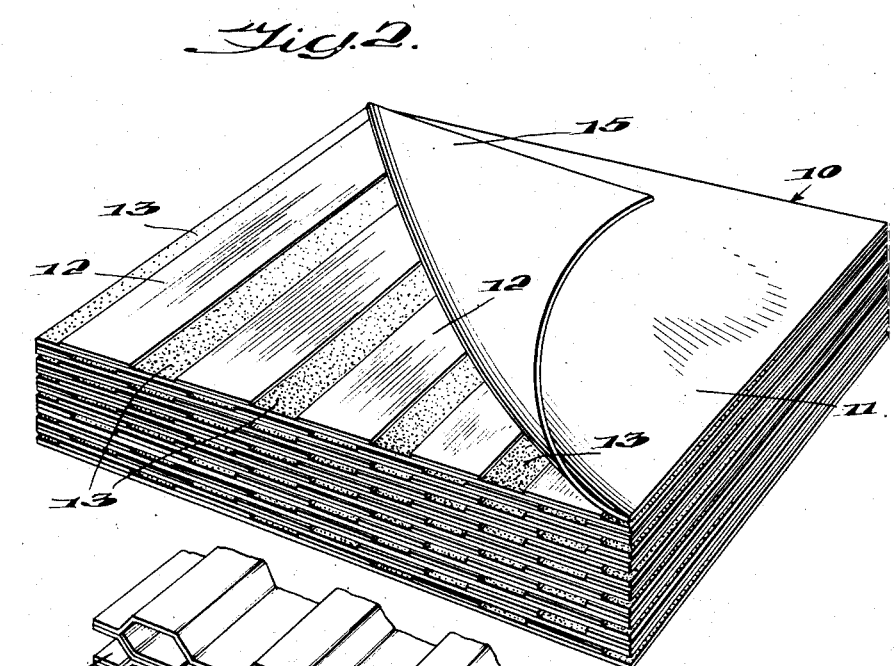
Figure 2 is a perspective view of an assembly of the core material with the top sheet turned back to show positioning of the masking strips.
Figure 3:
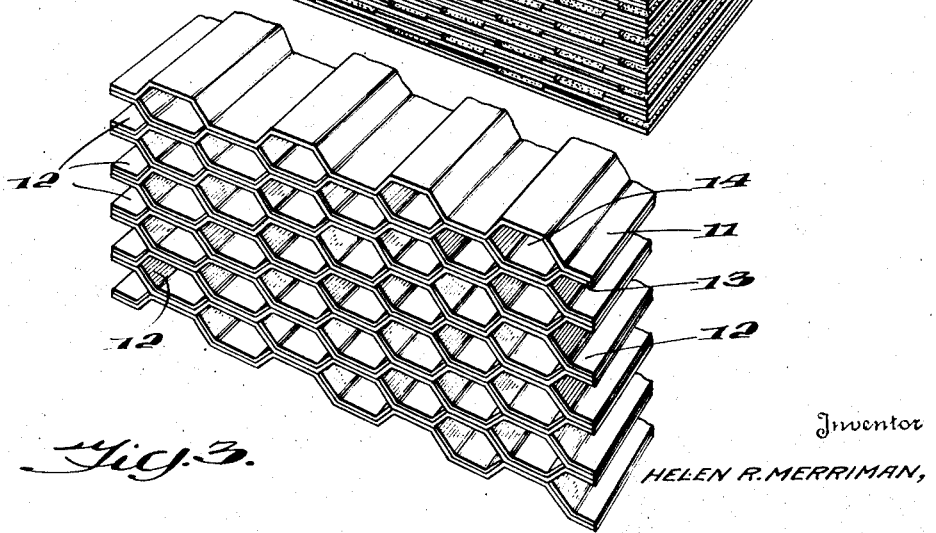
Figure 3 is a perspective view of the finished product.

Referring now to Figure 1, I have illustrated an assembly 10 of sheets of fabric material adapted for bonding together at longitudinally spaced intervals. The assembly 10 consists of a plurality of thin resin impregnated fabric sheets 11 placed in stacked formation and prevented from contacting each other at predetermined spaced intervals by adhesion barriers formed as masking strips 12 cut to predetermined widths and placed therebetween. Masking strips 12 are of cellophane, or a like flexible material that will not adhere to the fabric sheets 11 when subjected to the temperature employed to bond the sheets together as hereinafter discussed. The intervening areas where the sheets 11 are allowed to make contactual engagement between each other are arranged to provide the plurality of spaced bond areas 13. The spacing and width of each bond area 13 is predetermined so that when the sheets 11 are suitably brought together at said bond areas arranged at spaced intervals between successive pairs of sheets throughout the assembly 10 and bonded together a plurality of uniformly sized and spaced collapsed cells are formed. Separation of the sheets 11 at the non-bonded areas effects expansion of the cells 14 (Figure 3) having double and single wall areas with the non-bondable masking strips 12 spaced adjacent thereto.

I have found that when used as core material between metal surface sheets that the most efficient structure is obtained by the use of sheets formed from cotton fabric weighing substantially 12 grams per square foot, impregnated with phenolic laminating varnish to a content of substantially fifty percent (50%) by weight. The width of the sheets is not critical and can be varied to suit the particular capacity of the press used in bonding the assembly of sheets together. For instance, in the quantity production of sandwich material for commercial use, it will be found economical to form the original assembly as a relatively wide slab adaptable to being cut into a plurality of conventional core thicknesses, such as $1/4$, $1/8$ and $1/2$ of an inch. The pack thickness of assembly 10 and the number of sheets bonded together at any one time will likewise depend on the desired width of finished structure. The geometrical pattern of the cell is determined by the arrangement and spacing of the bond areas. In most instances, the standard hexagonal form of cell will be found most satisfactory, such as in forming core material for use with either flat or saddle-shaped surface sheets, whereas a trapezoidal cell formation is best adapted to the forming of double curvatures.

The method of producing is to assemble the sheets 11 and determine the areas to be exposed for bonding, shown as unmasked areas 13 in Figure 1, and cover the intervening spaces with a bond preventing agent formed as masking strips 12 of cellophane, or like material, so that only the unmasked areas of the assembly 10 will bond together when heated. The assembly 10 of sheets 11 and masking material 12 is then placed in a press and heated to substantially 305° F. for approximately five (5) minutes under pressure to effect bonding of the sheets to each other at the longitudinally spaced bond areas 13. The assembly 10 of bonded sheets 11 and non-bonded strips 12 is then removed from the oven and after cooling is cut or sliced into strips of the desired thicknesses. In those instances where a stabilizing core suitable for use between sheets having curved surfaces is desired, strips of material of the required core thickness are best cut to the prescribed radius from the assembly in its compressed condition. I have also found it a good practice to perform all sizing of the material to close tolerance such as by sanding while in a compressed condition. The adhesion between the fabric and the flexibility of the assembly allows for full expansion of each cell of the assembly to provide a panel of the desired width as predetermined by the number of sheets for a given cell size. The panel is held in its expanded condition by a suitable stretching form of conventional design and heated to substantially 300° F. for approximately twenty (20) minutes to stiffen the cell walls and fix the geometry of the fully expanded cells to provide the finished structure shown in Figure 3. Removal, if desired, of the masking material from the finished panel can be readily effected with a blast of air from a conventional air line.

Tests have proved that a hexagonal cell diameter of substantially 0.43 inch is the most suitable spacing for use with aluminum or magnesium alloy face sheets of from 0.016 to 0.051 of an inch in thickness; however, it is recognized that in cases where the weight and strength limitations permit this dimension may be varied.

Although several modifications of my invention have been shown and described in detail, it will be appreciated that certain changes, alterations, modifications and substitutions can be made without departing from the spirit and scope of the appended claims.

I claim as my invention:

1. A method of making honeycomb structural material which comprises bonding sheets of phenolic resin impregnated fabric material together at areas spaced longitudinally of the sheets by the application of heat and pressure and preventing adhesion therebetween at intervening spaces with strips of non-bondable material spaced longitudinally of said sheets to form an assembly of sheets having alternately arranged bonds spaced parallel to each other throughout the assembly with intervening areas of the said sheets non-bonded areas, shaping the assembly to the desired width and contour by working transversely of the bonded and non-bonded areas, then separating the unbonded areas away from each other so as to form a cellular structure, and curing said cellular structure to fix the position and formation of the cells.

2. A method of making a low density cellular core material comprising forming a stack of alternate layers of resin impregnated fabric sheet material and barrier strips of relatively thin and adhesive-resistant material, arranging said strips in each layer in laterally spaced relationship to one another to define a plurality of bond areas therebetween with the width of said bond areas being always less than the widths of said strips, and said strips and bond areas being arranged in staggered relationship in successive layers, applying heat and pressure to said stack, thereby bonding said sheets of resin impregnated fabric together at said spaced bond areas, then expanding said stack generally normal to the plane of said layers, causing said sheets to separate in their unbonded areas so as to form a cellular structure, and finally curing said resin impregnated fabric while holding said stack in said expanded condition for fixing the position and formation of the cells.

3. A method of making a low density cellular core material comprising forming a stack of alternate layers of cotton fabric impregnated with phenolic resin and barrier strips of cellophane, arranging said strips in each layer in laterally spaced relationship to one another to define a plurality of bond areas therebetween with the width of said bond areas being always less than the width of said strips, and said strips and bond areas being arranged in staggered relationship in successive layers, applying heat and pressure to said stack thereby bonding said cotton fabric impregnated with phenolic resin together at said spaced bond areas, said bond being effected by the adhesive properties of said impregnated resin, then expanding said stack generally normal to the plane of said layers, causing said cotton fabric material impregnated with phenolic resin to separate in their unbonded areas so as to form a cellular structure, and finally curing said resin impregnated in said cotton fabric material while holding said stack in said expanded condition thereby fixing the position and formation of the cells.

4. A cellular core construction comprising a plurality of sheets of fabric material impregnated with phenolic resin, each sheet being bonded to its adjacent sheets at regularly spaced intervals and spaced therefrom at intervening spaced intervals to form a plurality of open ended cells, each said cell having a pair of double thickness walls connected by walls of single thickness.

5. A cellular core construction comprising a plurality of sheets of fabric material impregnated with phenolic resin, said resin bonding each said sheet to its adjacent sheets at regularly spaced intervals with portions of said sheets intermediate of said bonded intervals being spaced apart to form a plurality of substantially hexagonally shaped open-ended cells, said cells having a pair of opposed walls of double thickness and two pairs of opposed walls of single thickness, said phenolic resin being cured, thereby adds strength to said core and fixes said cell shape.

HELEN R. MERRIMAN.

REFERENCES CITED

The following references are of record in the file of this patent:

UNITED STATES PATENTS

| Number | Name | Date |
|---|---|---|
| 1,002,132 | Brown | Aug. 29, 1911 |
| 1,019,406 | Baekeland | Mar. 5, 1912 |
| 1,924,472 | Thomson | Aug. 29, 1933 |
| 2,369,006 | Banks | Feb. 6, 1945 |
| 2,381,074 | Muller et al. | Aug. 7, 1945 |
| 2,426,058 | Scogland | Aug. 19, 1947 |
| 2,428,979 | May | Oct. 14, 1947 |
| 2,454,719 | Scogland | Nov. 23, 1948 |
| 2,477,852 | Bacon | Aug. 2, 1949 |

FOREIGN PATENTS

| Number | Country | Date |
|---|---|---|
| 545,090 | Great Britain | May 11, 1942 |

OTHER REFERENCES

Ser. No. 212,075, Dornier (A.P.C.), published May 11, 1943.

"Honeycomb Core in Sandwich Structure," article by Meyer et al., published in "Modern Plastics," July 1945, page 136.